Patented Sept. 7, 1943

2,328,625

UNITED STATES PATENT OFFICE 2,328,625

PROCESS OF PREPARING PIGMENTED NITROCELLULOSE COATING COMPOSITIONS

Carrol A. Doran, Parlin, and Clarence R. De Bow, Jr., Penns Grove, N. J., assignors to E. I. du Pont de Nemours & Company, Wilmington, Del., a corporation of Delaware No Drawing. Application December 19, 1940, Serial No. 370,822

4 Claims. (Cl. 210—203)

This invention relates to a process of preparing grit and gel-free coating compositions and more particularly to a process of preparing grit- and gel-free pigmented nitrocellulose lacquers, and still more particularly to a selective filtration of pigmented nitrocellulose lacquers.

It is necessary in the manufacture of pigmented nitrocellulose coating compositions to remove pigment agglomerates and pigment aggregates as well as considerable gelatinous material in order to produce materials giving glossy, dry films. Nitrocellulose coating compositions or lacquers are characterized by their relatively high viscosity, which is due mainly to the presence of the nitrocellulose itself. Filtration of nitrocellulose compositions of all types has always presented numerous difficulties. Primarily these difficulties are due to the incompletely dissolved portions of nitrocellulose. These gelatinous particles are normally soft and mobile so their shape can be greatly altered by the exertion of pressure upon them and they form a compressible filter cake. The particles tend to pass through the filtering medium unless they are trapped. This makes necessary the use of filtering media which have a pore size smaller than that of the apparent size of the normal gelatinous particle.

These gel particles, while removable by use of a suitable filter medium, for example, a fine felt cloth or filter paper, act to compress and to plug the pores of the filter medium rather than to build up a non-compressible porous cake on the filter. When the materials being filtered include a dispersed pigment, the majority of whose particles being such that they can theoretically pass through the filtering medium selected, the formation of a gelatinous coating on the pores of the true filter medium reduces the filtration efficiency enormously. Complete plugging of the system is quickly reached as a result, and even during the active period of filtration there is some tendency to remove useful pigment particles as the effective pore size of the filter medium is being reduced by the plugging action of the gels.

A means of trapping the gelatinous particles to prevent early plugging has been to add to the clear nitrocellulose composition a small portion of a "filter aid" such as diatomaceous earth, fuller's earth, or similar material. The relatively coarse particles of the diatomaceous earth build up on a filter bed which may be of fine wire, paper, woven fabrics or felt or the like, and the gelatinous particles have a pronounced tendency to stick to the particles of filter aid rather than clogging the pores of the filter medium. Thus, the addition of a filter aid to a clear nitrocellulose composition improves its filtering characteristics. However, when dispersed pigment particles are added to a nitrocellulose composition, the filtration problem becomes much more difficult.

Commercial filter aids normally contain particles having a great variety of shapes and sizes, and the effective pore size is relatively small, so small, in fact, that when dispersed pigments are present in the nitrocellulose compositions, a considerable portion of the pigment may remain on the filter bed after the filtering operation is completed. Also, the pigment particles tend to act somewhat as a filter aid when they form part of the filtering mass itself. Due to the fact that the dispersed pigment particles are normally smaller in size than the great majority of the filter aid, the effective pore size is greatly reduced and it is impossible to filter nitrocellulose enamels rapidly or in any quantity unless the filter is frequently cleaned.

This invention has as an object the provision of an improved means of filtering pigmented nitrocellulose compositions. A further object is the provision of a means of removing all particles sufficiently large to interfere with the gloss characteristics of the pigmented nitrocellulose compositions. A still further object is the provision of a filter mass having a pore size sufficiently large to pass substantially all of the highly dispersed pigment particles but small enough to trap gelled particles and also pigment aggregates and agglomerates visible to the naked eye. A further object is the selective filtration of pigmented cellulose derivative compositions. Other objects will appear hereinafter.

We have discovered that there exists a critical value in the effective pore size of the "filter aids" below which it is impossible to secure continued and rapid filtration of pigmented nitrocellulose compositions, but above which rapid, continued filtration is secured so that large volumes of enamel can be processed at low cost and without replacement or cleaning of the filtering medium. This effective pore size is much larger than that possessed by the great majority of commercial diatomaceous filter aids and can be produced only by special processing. However, the methods of producing such an effective pore size are several and are not within the scope of this invention. Heretofore because of the small effective pore sizes of the filter aids available, it has not been possible to obtain any great advantage through the addition of filter aids to the pigmented composition being filtered and the considerable art developed in the use of filter aids has been utilized to no avail.

Before the importance of our discovery can be appreciated fully, it must be understood that normally "filter aids" are used to assist in the removal of substantially all particles of a size sufficiently large to interfere with the transmission of a beam of light through the filtered liquid and the use of a beam of oriented light rays known as a Tyndall beam is normally resorted to as a test medium. Pigmented compositions are basically designed to interfere with transmitted light and great numbers of particles are added to the nitrocellulose for this purpose. This results in the so-called "hiding power" of the composition. Thus, either the technique of using commercial "filter aids" must be discarded and a new technique developed or advantage must be taken of our discovery that there is a critical minimum effective pore size of filter aid suitable for pigmented nitrocellulose compositions. The first alternative has not been satisfactorily accomplished, and as a result commercial filter aids have not heretofore been used for the filtration of commercial pigmented nitrocellulose compositions.

It has been found that when dirt particles and the particles of partially dissolved or gelled nitrocellulose are to be removed from unpigmented nitrocellulose solutions, several of the commercially available filter aids having a small effective pore size will assist in the filtration. When the same filter aids are used with pigmented nitrocellulose compositions, very low through-puts are obtained, that is, gallons of material per square foot of filtering area. Also, portions of the useful pigment particles are removed, resulting in a distinct waste of costly pigmenting material, a lowering of the hiding power of the enamel and often a simultaneous lowering of the durability of the enamel. The finely dispersed pigments of the present practice have a particle size of one micron or less with few exceptions. Among the exceptions, we have such pigments as the ultramarine blues in which sintered particles prevent easy grinding, and in this case many particles range in size from 1 to 5 microns. In the case of carbon black, the average size of a finely dispersed particle is of the order of $1/100$ micron distinguishable only with an electron microscope.

The average particle size of diatomaceous earth such as is found in Lompoc California deposits, is reported to be of the order of 15 microns. It would be assumed, therefore, that little difficulty would be encountered in dispersing the pigments having a particle size of 1 micron or less in a nitrocellulose composition and passing them through a filter bed of this same diatomaceous earth. Practically, however, the diatomaceous earth contains definite portions of clay-like particles and considerable proportions of particles smaller than the 15 micron average size. It is also true that the particles of diatomaceous earth have a great variety of shapes, so that in certain dimensions, for instance, in the needle-like forms they approach 1 micron or less, and in building up a filter cake the average effective pore size is such that an appreciable proportion of the finely dispersed pigment in the nitrocellulose compositions is trapped on the filter bed. This trapping of pigment particles in addition to being wasteful, has the effect of lowering the efficiency of the filter medium in that only small amounts of enamel can be filtered before the rate of flow is reduced to a point that it is no longer economical to continue the filtration.

It is the principal object of this invention to remove all gelled particles, aggregates, agglomerates, agglutinates and dirt particles from the pigmented nitrocellulose compositions which are large enough in size to interfere with the proper application of the coating composition or to prevent the realization of the optimum gloss and general appearance of the final dry film. These contaminants may result from the use of poorly ground dry pigments, from poor dispersion methods during incorporation of the dry pigments into the colloidal organic solution, to what is often called mixing grit or to incompletely soluble nitrocellulose. Dirt also tends to accumulate during the various manufacturing operations.

The careful filtration of pigmented nitrocellulose compositions has been avoided heretofore, wherever possible, but in order to produce satisfactory commercial products approximately one-third of all the enamels produced must be filtered through a medium such as the commercial filter felt, of which Continental No. 2D felt is typical. In order to keep the quantity of enamel to be fine-filtered as low as possible, many means have been used in the manufacturing of the intermediate products. The clear or pigment-free nitrocellulose base solutions are ordinarily filtered, oftentimes using filter aids. The pigments are dispersed in resin solutions by ball mill grinding, or mixed into high viscosity nitrocellulose colloids by means of a heavy duty mixer, or the pigments are dispersed by milling into very stiff nitrocellulose colloids by means of heavy steel rolls. In all cases the efficiency of the dispersion is dependent upon the conditions used in the process, and in order to avoid fine pigment grit in the finished enamel, the dispersion process is often carried to extremes. Also, resin solutions used in the preparation of the enamels are settled or filtered before addition to the final batch.

By a combination of preliminary dispersion processes and filtration steps the intermediate products are made substantially grit-free. These intermediate products are then blended in a predetermined order and mixed by high speed, efficient rotating paddle mixers, or their equivalents, until flow-outs or pours of the enamels on metal or paper show that the mixing grit so-called, has been reduced as far as it is possible to do so by this particular operation.

It is at this point that it has been found, as a result of long experience, that approximately one-third of the enamels manufactured must still be carefully filtered to further eliminate the undesirable particles. The remaining two-thirds of the enamel manufactured is ordinarily filtered by gravity through a wire screen of 60 or 100 mesh. This type of filtration removes dirt, hair and much of any other contaminating material which may have entered the final mixer but does not remove pigment aggregates or mixing grit. The wire screen filtration is not particularly difficult. It is the fine filtration of enamels with which this invention is concerned.

Contrary to the normal experience of the industry for other products, the use of the commercial pressure type filter presses, such as the Shriver plate and frame press, has not heretofore proved practical for pigmented nitrocellulose compositions because of the compressible cake formed, and although several modifications have been suggested, a very considerable proportion of the filtration has been carried out by the so-called bag filters. These are fundamentally simple in that an inner layer of felt and an outer layer of nainsook is tied on or wired on to a pipe leading from the bottom of the enamel mixer. The enamel is allowed to flow into the bag under the normal pressure of gravity. The low pressure involved minimizes the compression of the cake formed. It is unsafe to use air pressure, and squeezing of the bag is resorted to. This semi-mechanical operation is designed to free the pores of the gelatinous material which quickly accumulates, part of this being displaced inside the bag and a small part forced through the pores of the bag. The fact that some of the material is actually being forced through renders the final product an incompletely filtered one.

In a typical filtration of this type and working with a black automotive nitrocellulose composition having a viscosity of approximately 2.5 poises at 25° C., it was found possible as the result of several squeezing operations to obtain a total through-put of 22.6 gallons per square foot of effective filtering area. A pressure filtering operation carried out on the same batch of enamel through a small plate and frame press using the same felt and nainsook filtering medium and using a final pressure of 50 pounds per square inch gave only 10.4 gallons per square foot. This low through-put is due to plugging of the pores by the gel and by the spongy, easily compressible nature of the filter cake formed.

Filter aids of the diatomaceous earth type are available in a variety of grades ranging from crude or raw diatom deposits which contain clay, silts, etc., through selected grades. Other grades of filter aid represent chemically treated diatomaceous earth or material which has been calcined sufficiently to sinter the clayey components without fusing the diatom skeletons. In general, the processing of the crude diatomaceous earth has as its object the control of the size distribution of the particles, and this is usually controlled by air separation or classifier processing. Normally the definition of the grade is dependent upon what amounts to practical filtration experiments, that is, for example, results secured when filtering a sugar solution or other readily secured and reproducible standard solution.

The experiments are carried out by adding to the test liquid a small amount of the filter aid in question. This is thoroughly mixed into the batch until a uniform suspension is secured. The batch is then pumped through a filtering medium such as felt or fine wire until a thin layer of the filter aid is caught by the filter medium producing a filter bed. The initial filtered liquid is then returned to the starting tank in which agitation continues and the filtration proper is started. This is carried out by maintaining a carefully regulated pressure and a constant temperature (in order to maintain a constant viscosity). The rate of filtration or the through-put in a definite period of time is measured in gallons or pounds and is normally expressed as gallons or pounds per square foot of filter area. The total through-put is expressed in the same manner but is independent of the time or rate of flow.

In contrast to most filtrations wherein the object is to remove substantially all solid particles from the fluid or composition under treatment, the filtration of nitrocellulose enamels is truly a selective process. We have found that contrary to the findings of previous investigators, filter aids of the diatomaceous earth type can be advantageously used in the selective filtration of pigmented nitrocellulose solutions, provided that the effective pore size of the filter aid is kept sufficiently large.

Carman has described a method for determining the permeability coefficient of a diatomaceous filter aid in the Journal of Industrial & Engineering Chemistry, volume 31 (1049-1050), and establishes the reliability of this value as a measure of the effective pore sizes formed by a bed of diatomaceous earth. The term "effective pore size" as used in this specification is one which cannot be expressed in definite dimensions but refers to the permeability coefficient K in the equation (D'Arcy's law for porous media modified by introduction of the term for the absolute viscosity $\eta$ in poises).

$$\frac{dV}{d\theta} = KA\frac{P}{\eta L}$$

K is a constant, typical of the porous medium and independent of the liquid used. A is the cross-sectional area of the filter cake, L is the thickness of the cake, V the volume of liquid passed in time in seconds $\theta$, and P is the pressure difference across the cake in grams per square centimeter. All determinations of the permeability coefficient, referred to herein, were made using C. P. acetone as the test liquid.

A commercial diatomaceous filter aid recommended for the filtration of varnishes, resin solutions and clear nitrocellulose solutions was found by experiment to have a permeability coefficient of $1.63 \times 10^{-5}$ for K, and in practical tests on clear nitrocellulose solutions gave a satisfactory rate of flow and through-put before clogging of the filter medium. When tried in the filtration of a black pigmented nitrocellulose composition, it was completely unsatisfactory in that a portion of the useful pigment was removed and only small amounts of enamel could be forced through the filter press, much less than could be passed through the bag filters previously described.

A coarser grade of commercial diatomaceous earth having a K of $2.1 \times 10^{-5}$ was also tried for both clears and enamels. The filtration of clears proceeded at a more rapid rate than when using the finer material. Also, a gain occurred in total through-put. However, when used with black enamels, although the initial rate of through-put was higher than in the case of the finer grade, clogging quickly occurred and considerably less material was filtered per square foot of filter cloth than when the simple bag filter was used.

It was not until a grade of diatomaceous earth filter aid having a permeability coefficient of at least about $3.0 \times 10^{-5}$ was used that the real advantages of the use of filter aids with enamels was established and the through-puts rose above those obtained with the simple bag filter.

*Example 1*

To illustrate the difference in practical use, filtrations were carried out using a Shriver plate press, the plates having an available filtering area of 6.52 square feet. A single layer of Continental D-2 felt was used as the filtering medium, being placed over a coarse wire screen. The purpose of the screen was to prevent forcing the felt into the channeled plates of the press. Diatomaceous filter aid, having a permeability coefficient of $3.4 \times 10^{-5}$ was mixed with a black nitrocellulose enamel under test to the amount of 0.15% by weight based upon the total weight of the enamel. The enamel had a viscosity of approximately 2 poises at 25° C. Prior to the actual determination of through-put and rate of flow, a small mount of enamel plus filter aid was passed through the press and returned to the storage tank. This started the formation of a cake of the filter aid on the felt filtering material. The enamel was then forced through the system by a pump. The pressure used at the start was 15 pounds per square inch and this was gradually increased to 50 pounds per square inch. The total through-put represented all the material passed through (not counting the initial precoating) until the rate of flow through the press had practically ceased at the 50 pounds per square inch pressure. Total through-put was 987 pounds per square foot of filter area.

A filtration carried out on the same enamel, using the conventional felt and nainsook bag and without filter aid, gave a through-put of 384 pounds per square foot before excessive clogging occurred. In this operation the bag was squeezed at regular intervals to stimulate the flow rate.

*Example 2*

Utilizing a maroon pigmented nitrocellulose enamel, a grade of filter aid having a K of $1.63 \times 10^{-5}$ was compared with a grade having a K value of $3.1 \times 10^{-5}$. The particular maroon tested represented an enamel extremely difficult to filter in any way due to the difficulties of dispersing this type of pigment. The tests were made utilizing a standard Shriver press using 5–7″ plates having a total area of 2.5 square feet. One-half pound of diatomaceous earth was added per 100 pounds of enamel. The viscosity of the enamel at 25° C. was approximately 10 poises. The maximum pressure in each case was 100 pounds per square inch.

| K of diatomaceous earth | Through-put lbs./sq. ft. |
|---|---|
| $1.63 \times 10^{-5}$ | 8.4 |
| $3.10 \times 10^{-5}$ | 92.0 |

*Example 3*

An experiment was carried out in two parts, on the filtration of a black enamel having a viscosity at 25° C. of approximately 15 poises. A small Shriver plate press was used, the filtering area of which was ¼ square foot. In one portion of enamel a diatomaceous earth having a K of $3.1 \times 10^{-5}$ was added at the rate of 0.5 pound per 100 pounds of enamel. In the second experiment the enamel was filtered as received. The two filtrations were carried out under carefully controlled conditions and until at a pressure of 50 pounds per square inch no further marked flow of enamel took place. In the absence of the diatomaceous earth, plugging occurred in 50 minutes and after 62 pounds per square foot had passed through. The filtration utilizing the filter aid continued for 4 hours and 40 minutes and gave a total through-put of 209 pounds per square foot of filtering area. The rates of flow were substantially equal up to the plugging of the first filter. This is important because it is the total through-put which largely measures the economic worth of filtrations.

The quantity of material to be removed in the filtration of pigmented nitrocellulose compositions varies from batch to batch. Also, there is little chance of predicting what the filtration characteristics of a new formulation will be. We have found that regardless of the way in which the pigmented compositions are manufactured or regardless of the materials used in their formulation, the use of a diatomaceous earth filter aid having a permeability constant K of at least about $3.0 \times 10^{-5}$ will make economical the selective filtration of pigmented nitrocellulose compositions over a wide viscosity range. The value $3.0 \times 10^{-5}$ for K represents a lower practical operating limit, the existence of which had not been suspected. As the value of the permeability constant K increases beyond the critical value of $3.0 \times 10^{-5}$, both the rate of flow and the through-put continues to improve, and we prefer to use a filter aid having as high a value for K as it is possible to obtain. We are limited, however, by several considerations including the difficulty of securing filter aids having the larger effective pore sizes, the difficulty of maintaining a uniform suspension of the filter aid during the filtering cycle and especially the undeniable consideration that when the effective pore size becomes sufficiently great, the smaller pigment aggregates or agglomerates will pass through and the quality of the enamel will be affected.

We have found that for the highest quality enamels, filter aids having a value for K between $3.0 \times 10^{-5}$ and $4.0 \times 10^{-5}$ are eminently satisfactory and that at values for K as high as $4.5 \times 10^{-5}$ quality products can be produced. We prefer to make use of filter aids having permeability coefficients in the range of $3.0 \times 10^{-5}$ to $4.5 \times 10^{-5}$ and when the finest degree of filtration is required to between $3.0 \times 10^{-5}$ and $4.0 \times 10^{-5}$. However, in many special cases K values greater than $4.5 \times 10^{-5}$ can be satisfactorily used.

One of the principal functions of the filter aid is to trap the gelatinous particles on its surface, and thus to prevent the gels from entering the fine capillary pores of the final filtering medium, whatever this may consist of. The filter aid on which the gel has been deposited eventually approaches the filtering medium which by this time is a combination of the base filtering medium plus a layer of coated filter aid. It is here that the second principal function of the filter aid takes place. The filter aid dilutes the gelatinous residue preventing its coalescing to form a continuous film and when present in the optimum amount tends to form a porous, granular, practically incompressible cake, the pores of which are sufficiently large to allow the filtration to continue. As this cake builds up, the length of the pores increase and more pressure is required to maintain the rate of filtration at a suitable value. It is also true that the effective pore size decreases steadily as the filtration is continued because the filter aid is not completely effective in its operation. This gradual decrease in pore size can be at least partially compensated for by increasing the pressure applied. Finally a point is reached at which the rate of filtration is greatly reduced, and either a limit has been reached in the pressure available, or the effective pores have become so small that useful pigment particles are being removed from the enamel.

The quantity of filter aid required will normally represent 0.5% or less based upon the total weight of solution to be filtered. A good average figure for pigmented nitrocellulose compositions in which the pigment is mainly carbon black has been found to be 0.2% by weight. Sufficient should be present in any case to entrap the gelatinous material, so that a granular cake forms during the actual filtering operation. Excessive amounts only tend to build up thick filter cakes which increase the pressure required to push the compositions through the cake.

The use of diatomaceous filter aids is dependent upon thorough mixing with the pigmented nitrocellulose composition before filtration is started and some continued agitation may be required to prevent settling of the filter aids, especially when the viscosity of the composition is low. It is occasionally preferable to form a "pre-coat" with a layer of diatomaceous earth formed on a supporting medium provided the sufficient diatomaceous earth is also added to and dispersed in the enamel to trap the gelatinous particles.

The supporting medium for the filter cake can be any one of a number of materials. Many grades of felt cloth are available for filtering purposes and when used in conjunction with the suitable diatomaceous earth permit rapid, economical filtrations and produce enamels which give high gloss coatings. Types of felted cotton pads have been developed, some of which are the equivalents of the older wool felts in effective pore size. A great variety of paper filtering mediums are also available. The selection of a suitable base material will depend upon a number of factors including as most important in the selective filtration of pigmented compositions, an effective pore size large enough to pass the useful pigment particles. It is not necessary in all cases to use a material for backing capable of producing a satisfactory filtered product in the absence of the filter aid, as by prefiltering a first portion, a cake of filter aid will be built up having the correct effective pore size. It will be seen that a variety of filtering media can be used. It is also possible to use filter aids with permeability constants well above $3.0 \times 10^{-5}$ as we depend upon our filter-aid to trap the gelatinous particles and in this function the great variety of shapes present in diatomaceous earth and their surface irregularities make it the ideal medium, but only provided that in the self-packing characteristics of the diatomaceous earth the effective pores formed correspond to a permeability constant of at least $3.0 \times 10^{-5}$.

The use of the filter aids have proven to be most effective when the cake remains in contact with the support material so that this support is protected from the deposition of fresh gelatinous material. In a continuously operating filter, means can be provided for keeping the cake below a predetermined thickness by removing the top layer but, in general, complete removal of the filter aid cake at any point during the filtration will disturb the filtering efficiency. This might occur in the bag filter previously described, where it is poor practice both from the angle of total through-put as well as the danger of forcing particles of the filter aid into the final product. The use of these coarse filter aids is most effective in filtering systems where relatively high pressures can be applied.

Our discovery makes possible the rapid, efficient selective filtration of pigmented nitrocellulose solutions. It permits the substantially complete removal of pigment aggregates and agglomerates of a size great enough to interfere with the gloss of the coatings when applied and dried. Its selective operation permits substantially all of the useful, finely dispersed pigment to pass through the filtering medium, this material having an average particle size of 5 microns or less. In addition to passing the useful pigment particles, while retaining oversize particles, the use of the filter aid traps the gelatinous particles so that the pores of the filtering medium are kept open for a much longer filtering period, enabling increased average flow rates and markedly increased total throughputs of enamel. Heretofore it has been practically impossible to use one of the most common types of filter press, the plate and frame press (Shriver press) because of the extremely rapid clogging of the filter cloth by the gelatinous material present in solutions of nitrocellulose. This situation existed even though it was standard practice to use filter aids for clear nitrocellulose solutions and lacquer and to filter in standard Shriver presses.

The use of a diatomaceous earth having a permeability coefficient of $3.0 \times 10^{-5}$ or more, made possible the filtration of pigmented compositions in standard plate and frame presses and equivalent equipment and greatly reduced the cost of filtration. More uniform products are produced and when necessary products of improved quality and gloss can be produced. It permits the elimination of a number of relatively crude alternative filtering methods. The filter cake produced is distinctly granular and can be readily removed from a felt cloth, resulting in making possible reuse of the cloth in many cases. In addition to the special selective straining or filtering action of the coarse filter aid, its use gives a high degree of non-compressibility because of the strength and rigidity of the silica particles of the diatomaceous earth. Here the pressure is taken by the filter aid, which packs on the supporting medium, and the resistance to flow is independent of the pressure, whereas with the sludge from the pigmented nitrocellulose compositions a considerable amount of compressibility is possible and as the pressure is increased there is a pronounced increase in resistance.

It is to be understood that the foregoing detailed description is given by way of illustration and that many variations may be made therein without departing from the spirit of our invention.

We claim:

1. The process of preparing a grit- and gel-free pigmented nitrocellulose coating composition by selective filtration which comprises uniformly suspending therein from 0.1 to 0.5 per cent by weight of a diatomaceous filter aid having an inherent permeability coefficient of at least $3.0 \times 10^{-5}$, and thereafter filtering the said pigmented nitrocellulose coating composition under pressure.

2. The process of preparing a grit- and gel-free pigmented nitrocellulose coating composition by selective filtration which comprises uniformly suspending therein from 0.1 to 0.5 per cent by weight of a diatomaceous filter aid having an inherent permeability coefficient in the range of about $3.0 \times 10^{-5}$ to $4.5 \times 10^{-5}$, and thereafter filtering the said pigmented nitrocellulose coating composition under pressure.

3. The process of preparing a grit- and gel-free pigmented nitrocellulose coating composition by selective filtration which comprises uniformly suspending therein from 0.1 to 0.5 per cent by weight of a diatomaceous filter aid having an inherent permeability coefficient in the range of about $3.0 \times 10^{-5}$ to $4.0 \times 10^{-5}$, and thereafter filtering the said pigmented nitrocellulose coating composition under pressure.

4. The process of preparing a grit- and gel-free pigmented nitrocellulose coating composition by selective filtration which comprises uniformly suspending therein from 0.1 to 0.5 per cent by weight of a diatomaceous filter aid having an inherent permeability coefficient of at least $3.4 \times 10^{-5}$, and thereafter filtering the said pigmented nitrocellulose coating composition under pressure.

CARROL A. DORAN.
CLARENCE R. DE BOW, Jr.